United States Patent
Otani

Patent Number: 5,155,647
Date of Patent: Oct. 13, 1992

[54] DISK CARTRIDGE WITH IMPROVED SHUTTER ASSEMBLY

[75] Inventor: Masatoshi Otani, Kanagawa, Japan

[73] Assignee: Sony Corporation, Tokyo, Japan

[21] Appl. No.: 641,766

[22] Filed: Jan. 16, 1991

[30] Foreign Application Priority Data

Jan. 17, 1990 [JP] Japan ......... 2-7901
Jan. 17, 1990 [JP] Japan ......... 2-7902

[51] Int. Cl.$^5$ ............... G11B 23/03
[52] U.S. Cl. ................... 360/133
[58] Field of Search ......... 360/133; 369/291

[56] References Cited

U.S. PATENT DOCUMENTS 4,608,617  8/1986  Oishi et al. ............ 360/133
4,853,817  8/1989  Mizuta et al. ......... 360/133
5,021,913  6/1991  Overland et al. ...... 360/133

FOREIGN PATENT DOCUMENTS 3729241  3/1989  Fed. Rep. of Germany ...... 360/133

*Primary Examiner*—Robert S. Tupper
*Attorney, Agent, or Firm*—Hill, Van Santen, Steadman & Simpson

[57] ABSTRACT

In a disk cartridge comprising a case in which a disk-like recording medium is rotatably accommodated, and a shutter slidably secured to one end of the case so as to open and close a head insertion opening which is provided in the case, a resilient body for urging the shutter toward a position where the head insertion opening is closed is formed integrally with the shutter, so that the number of parts and the steps required for assembly of the disk cartridge can be decreased.

6 Claims, 5 Drawing Sheets

DISK CARTRIDGE WITH IMPROVED SHUTTER ASSEMBLY

BACKGROUND OF THE INVENTION

1. Field of the Invention

This invention relates generally to a disk cartridge, for example, most applicable to a floppy-disk, and more particularly is directed to a shutter thereof.

2. Description of the Prior Art

A previously proposed floppy-disk cartridge has been disclosed, for example, in Japanese Laid Open Patent No. 58-169379. Such a cartridge comprises a case in which a floppy disk is rotatably accommodated as a recording medium, a shutter slidably secured to the case to enable a head insertion opening to be opened and closed, and a torsion spring or a tension coiled spring for urging the shutter in a direction of closing the head insertion opening, both ends of the spring being engaged with the case and one end of the shutter, respectively.

When the floppy-disk cassette is out of use, the shutter is slidingly moved to the closed position thereof by the force of the spring to close the head insertion opening, so that the case.

When the cassette is to be used, the shutter is moved to the opened position thereof against the force of the spring, which urges the shutter in the direction for closing the head insertion opening when the cassette is inserted in a floppy disk driving apparatus. Thus, the head insertion opening is opened. Thereafter a magnetic head is inserted into the case through the head insertion opening to record information in, or reproduce information from, the floppy disk.

However, in the floppy-disk cartridge described above, the spring for closing the shutter is not an integral part of the shutter, so that the number of parts and the steps required for assembly of the cartridge increase. Particular in floppy-disk cartridges on the market, the spring is set inside the case, whereas the shutter is fitted outside the case. Thus it is impossible to set up the shutter simultaneously with the spring. The shutter and the spring must be separately secured to the case and then engaged with each other, so that it is troublesome and the assembly of the cartridge is complicated.

OBJECTS AND SUMMARY OF THE INVENTION

Accordingly, it is an object of the present invention to provide a disk cartridge in which a resilient body substituted for a spring which is conventionally used for closing a shutter is formed integrally with the shutter so as to extend from one end thereof, so that the shutter can be secured to the case of the cartridge simultaneously with the resilient body. Thus, the number of parts and steps required for the assembly of the cartridge can be decreased.

Another object of the present invention is to provide a disk cartridge in which such a troublesome work as to engage a shutter with a spring for closing the shutter can be omitted because both these parts are simultaneously secured to the case of the cartridge. Thus, the time required for assembling can be largely shortened and the mass production efficiency of the cartridge is much improved.

A further object of the present invention is to provide a disk cartridge in which a shutter, and a resilient body formed integrally with the shutter, are molded out of different synthetic resins, respectively. In particular, the shutter is made of such a synthetic resin as to be excellent in formability and to be weatherproof, so that it is easy to accurately form the shutter of a lesser thickness than 0.2 mm, and also it is possible to prevent the shutter from separating from a surface of the cartridge due to secular change of the synthetic resin.

Still a further object of the present invention is to provide a disk cartridge in which a shutter, and a resilient body formed integrally with the shutter are molded out of different synthetic resins, respectively. In particular, the resilient body for closing the shutter is made of such a synthetic resin as to be excellent in elasticity, so that the resilient body can be always smoothly deflected so as to securely move the shutter toward its closed position. Thus, the cartridge can be so tight as to exclude dust when out of use.

Still another object of the present invention is to provide a disk cartridge in which when a shutter, and a resilient body for closing the shutter, are simultaneously molded from different synthetic resins, respectively, the synthetic resin forming the resilient body is deeply penetrated into another body which forms the shutter, so that the resilient body is securely prevented from separating from the shutter.

In accordance with an aspect of this invention, a disk cartridge in which a recording medium is rotatably accommodated comprises a shutter slidably secured to one end of the case thereof to open and close a head insertion opening which is provided in the case, and a resilient body formed integrally with the shutter at one end thereof and being elastically deflectable. The free end of the resilient body abuts against the inside of the case, and due to elastic force of the resilient body, the shutter is urged toward a position where the head insertion opening is closed.

In a preferred embodiment of this invention, the shutter is made of a first synthetic resin which is excellent in formability and which is waterproof, and the resilient body formed integrally with the shutter at one end thereof is made of a second synthetic resin which is excellent in elasticity.

Moreover, in a preferred embodiment of this invention, the second synthetic resin forming the resilient body is deeply penetrated into the first synthetic resin which forms the shutter when the shutter and resilient body are simultaneously molded.

The above, and other objects, features and advantages of this invention, will be apparent from the following detailed description of illustrative embodiments thereof to be read in connection with the accompanying drawings, wherein like reference numerals identify the same or corresponding parts in the several views.

DETAILED DESCRIPTION OF PREFERRED EMBODIMENTS

Figure 1:
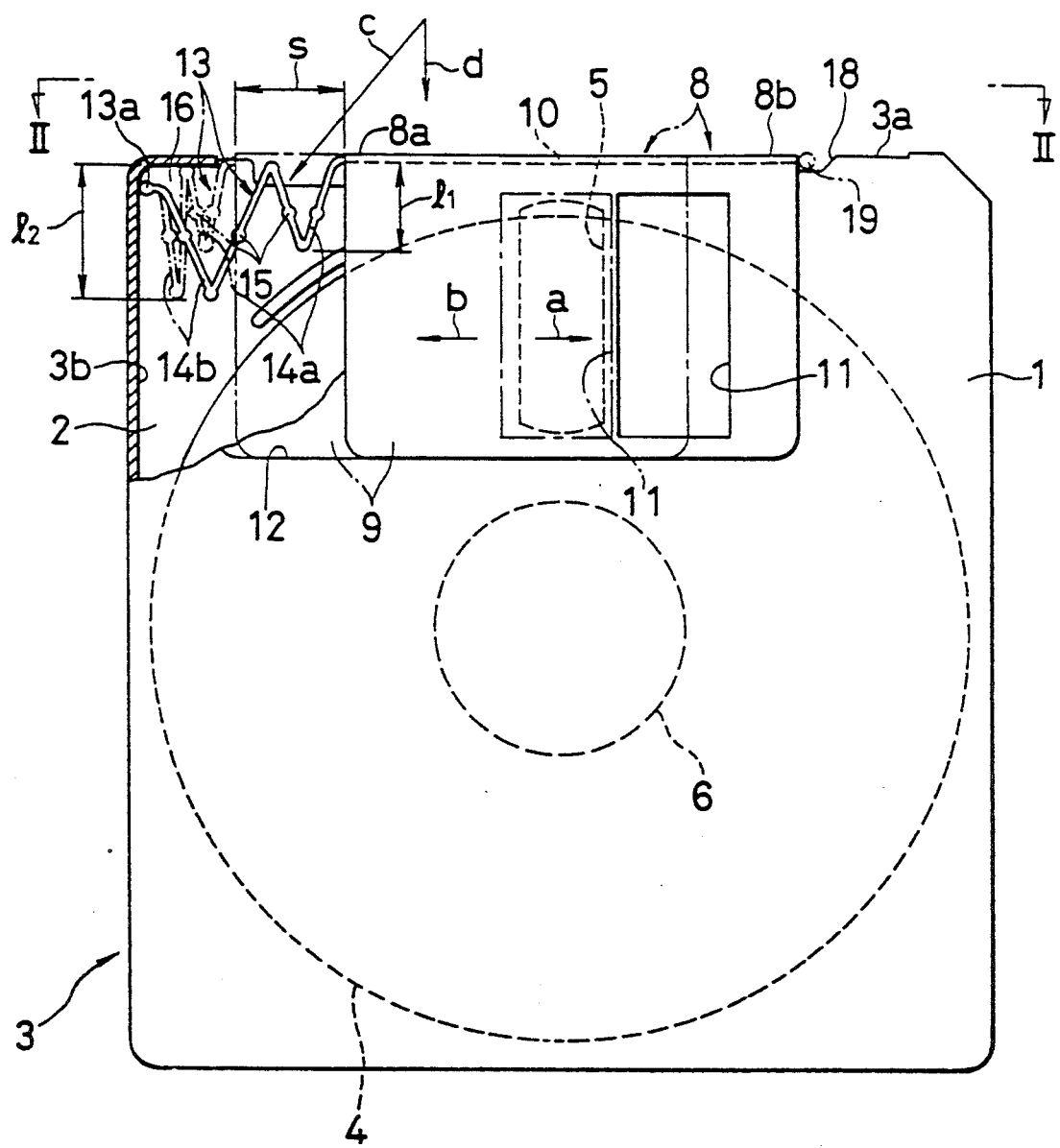
FIG. 1 is a plan view, partly broken away and in section, of a floppy-disk cartridge according to an embodiment of this invention.

A floppy-disk cartridge embodying the present invention will be described with respect to FIGS. 1-3. A case 3 comprising an upper half 1 and a lower half 2 is substantially of a thin square shape, and a magnetizable floppy disk as a recording medium is rotatably accommodated in the case. Substantially at the center of one end of the case 3, there are provided head insertion openings 5 of substantially rectangular shape in the respective upper half 1 and lower half 2. It is noted that the head insertion opening 5 may be provided at least in one of the upper half 1 and lower half 2. Substantially at the center of the lower half 2, there is provided a turntable insertion opening 6.

A shutter 8 for opening and closing the head insertion opening 5 comprises a pair of upper and lower shutting plates 9 which are parallel to each other, and a connecting portion 10 for connecting the shutting plates 9. Thus, the shutter 8 has substantially a U-shaped section. In both of these shutting plates 9, there are provided rectangular openings 11 located off the centers of the respective shutting plates 9. The shutting plates 9 are overlaid upon respective shallow stepped portions 12 provided in the upper and lower surfaces of the case 3 for the shutter 8 to be slidingly movable in a direction of arrows a, b along one edge 3a of the square case 3.

The shutter 8 is made of synthetic resin, and resilient body 13, which serves as a spring to urge the shutter 8 in the direction for shutting the head insertion opening 5, is formed integrally with the connecting portion 10 of the shutter 8 so as to extend from one end 8a of the connecting portion 10. The resilient body 13 comprises, for example, a plurality of V-shaped crooked parts 14a, 14b to form a zigzag body, and a plurality of knots 15 disposed at respective turning points and intermediate points between the turning points thereof.

The resilient body 13 is inserted into a substantially triangular space 1b of the case 3, which is formed by a corner of the case 3 and the periphery of the floppy disk 4. At that time, lest the crooked parts 14a and 14b should come in contact with the periphery of the disk, the height $l_2$ of the crooked part 14b shown in FIG. 1, which has been located farther from the shutter 8, is formed larger than the height $l_1$ of the other crooked part 14a.

As shown in FIG. 1, upon the free end 13a of the resilient body 13 being brought into contact with the inside of the case 3, the shutter 8 is urged, by the force of the resilient body 13, toward a position where the head insertion opening 5 is closed as indicated in solid lines in FIG. 1.

At a time when the shutter 8 is slidably secured to the case 3, the resilient body 13 is inserted into the space 16 of the case 3 along a direction of arrow c in FIG. 1 through a slot 17 that is formed between the upper half 1 and the lower half 2 along the edge 3a of the case 3. Simultaneously, the shutter plates 9 are overlaid along a direction of arrow d in FIG. 1 upon the respective stepped portions 12 of the upper and lower surfaces of the case 3. Thus, it is easy and simple to secure the shutter 8 to the case 3. It is noted that when the shutting plates 9 are completely overlaid upon the stepped portions 12 of the case 3, the shutter 8 is engaged in guide grooves (not shown) provided in the case 3, and thereby, the shutter 8 never separates from the case 3.

When the floppy-disk cartridge is out of use, the shutter 8 is slidingly moved in the direction of arrow a toward a closed position thereof by the force of the resilient body 13, and as the result, the head insertion openings 5 are closed by the shutting plates 9 of the shutter 8 as indicated in solid lines in FIG. 1; and the case 3 is sufficiently tight so as to exclude dust.

Figure 2:
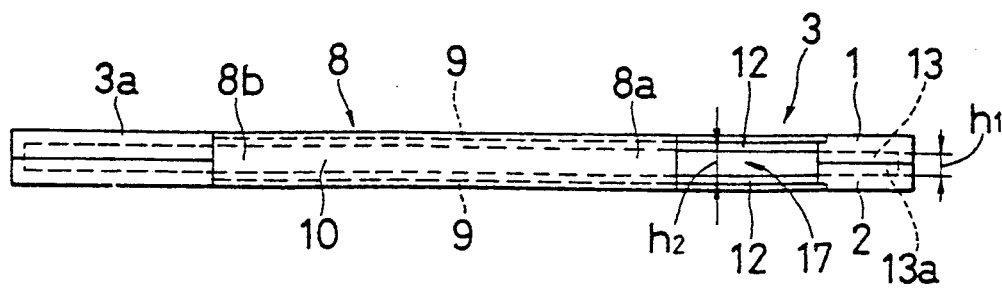
FIG. 2 is a side view taken along the line II—II of FIG. 1.
Figure 3:
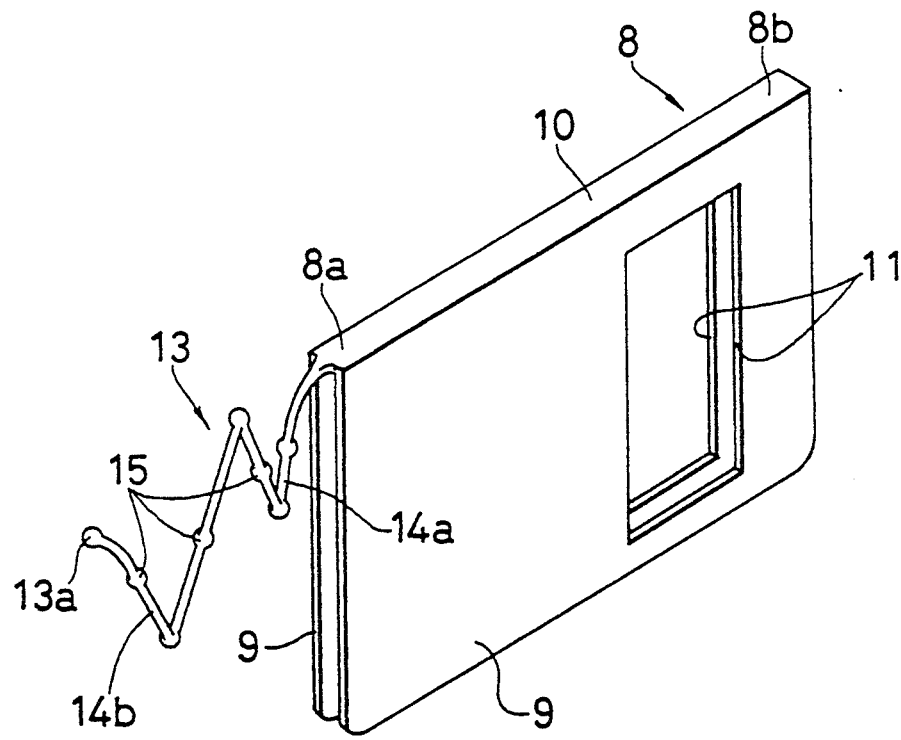
FIG. 3 is a perspective view of a shutter appearing in FIG. 1.

Meanwhile, when the shutter 8 is closed as shown in FIG. 1, the slot 17 of the case 3 is not covered with the connecting portion 10 of the shutter 8 by length S shown in FIG. 1, and is kept open as shown in FIG. 2. Always in order to close the slot 17, width $h_1$ of the resilient body 13 is made a little smaller than width $h_2$ of the slot 17 as shown in FIG. 2. Thus, the slot 17 is always closed by the resilient body 13 so as to be impervious to dust.

Upon the floppy-disk cartridge being inserted into the floppy-disk driving device, a shutter opening pin 19 shown in FIG. 1 is fitted in a recess 18 disposed along the edge 3a of the case 3 and is pressed against the other end 8b of the shutter 8, so that the shutter 8 is slidingly moved to the opened position thereof in the direction of arrow b against the force of the resilient body 13 as indicated in dot-and-dash lines in FIG. 1. In the opened position of the shutter 8, the openings 11 of the shutting plates 9 of the shutter 8 are just in accordance with the respective head insertion openings 5, so that the head insertion openings 5 are completely opened. Thereafter, a pair of magnetic heads (not shown) are inserted into the case 3 through the openings 11 and 5 for the magnetic heads to be brought into contact with the upper and lower surfaces of the floppy disk 4, and information is recorded in or reproduced from the floppy disk 4.

When the shutter 8 is opened as described above, the resilient body 13 is deflected as indicated in dot-and-dash lines in FIG. 1, and the plurality of knots 15 function in such a way that a stable elastic force is generated by the resilient body 13, and the turning points of the resilient body 13 are prevented from being damaged.

Figure 4:
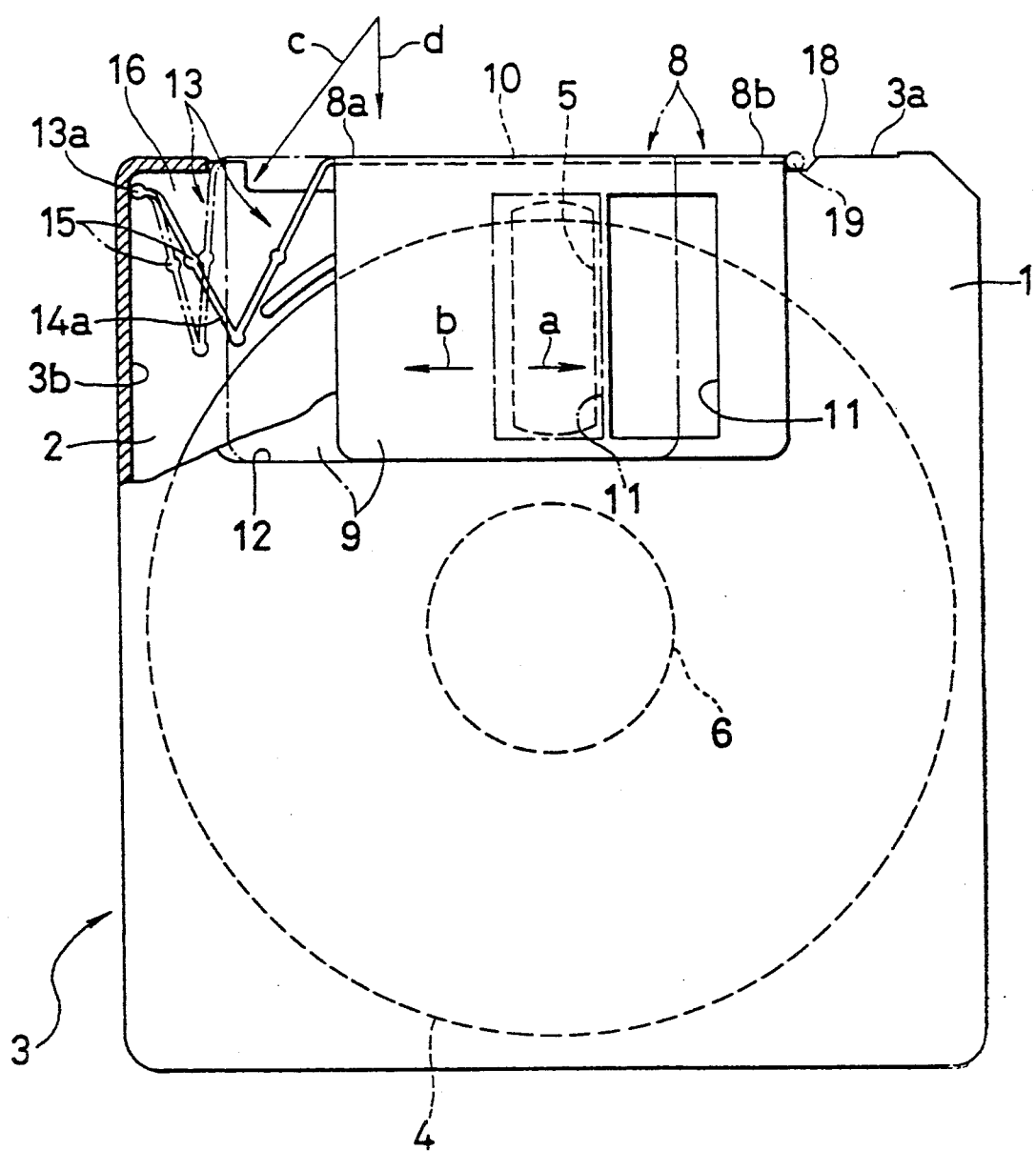
FIGS. 4 and 5 are plan views, partly broken away and in section, of floppy-disk cartridges obtained after some modifications of the embodiment shown in FIG. 1.
Figure 5:
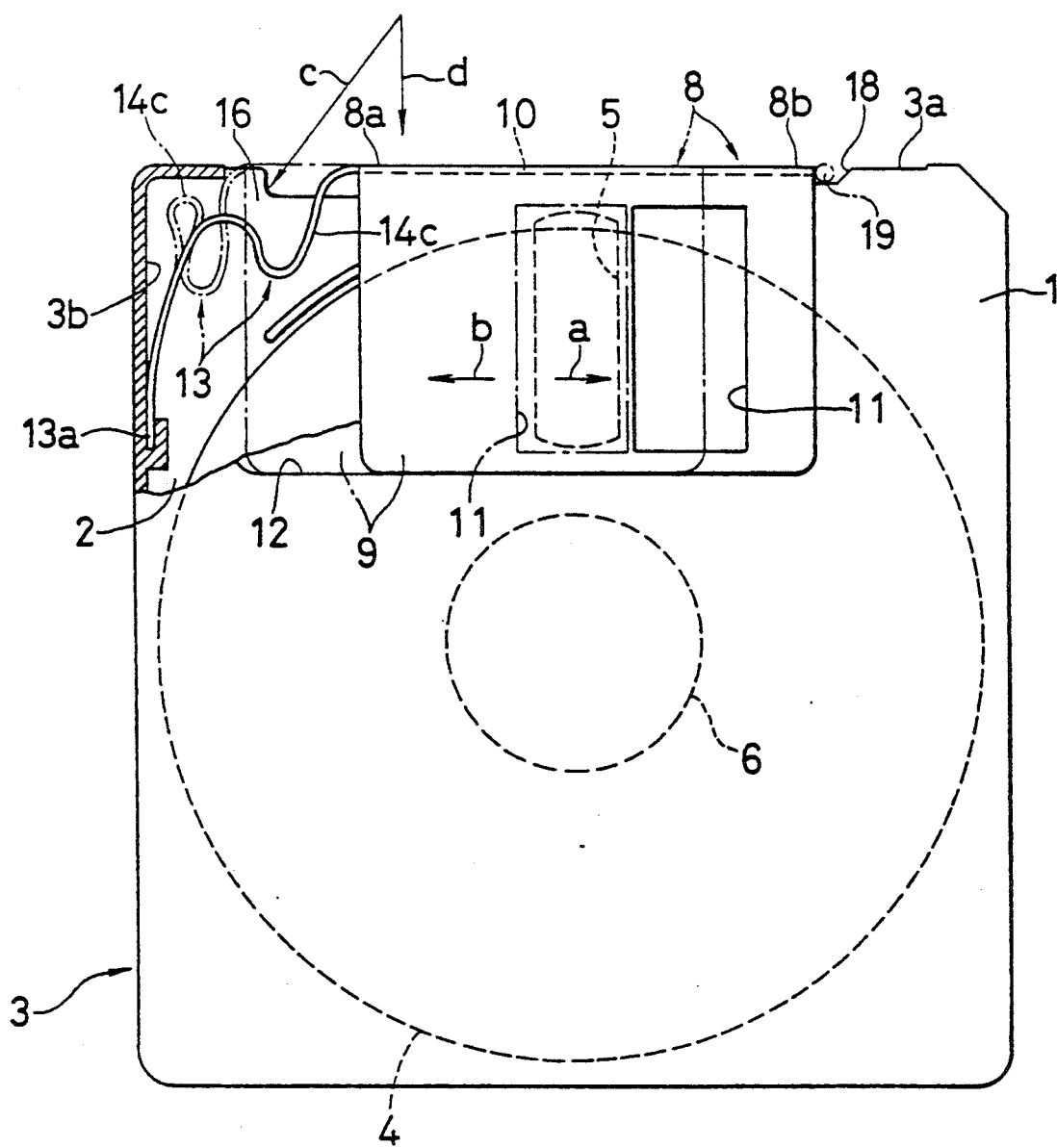

FIG. 4 shows a modification of the above-described embodiment, in which the resilient body 13 comprises a single V-shaped element. Further, FIG. 5 shows another modification of the above-described embodiment in which the resilient body 13 comprises a large strip 14c formed integrally with the shutter 8 to project from the end 8a of the connecting portion 10 of the shutter 8. The strip-like resilient body 13 may be shaped together with the shutter 8 by pressing when the shutter 8 is made of thin metal sheet or synthetic-resin sheet.

Figure 6:
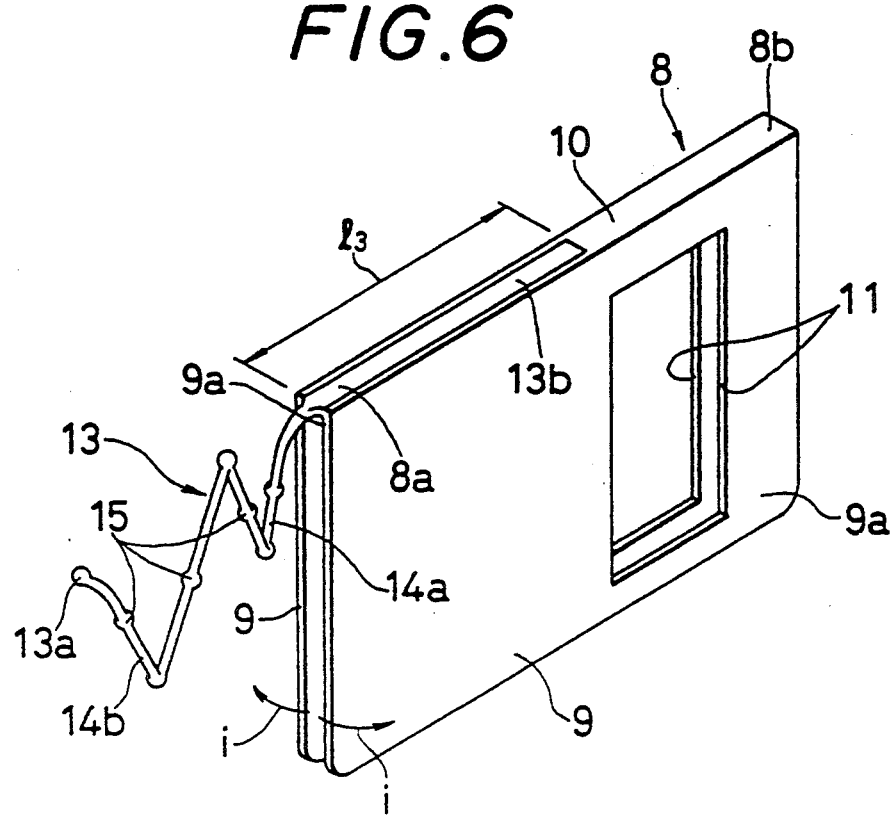
FIG. 6 is a perspective view of a shutter appearing in FIG. 4.

In a second embodiment illustrated in FIGS. 6-9, a shutter 8 shown in FIG. 6, which has a substantially U-shaped section and comprises a plurality of upper and lower shutting plates 9 and a connecting portion 10, is made of a first synthetic resin, such as polyacetal resin, which is excellent in formability and weatherproof. A resilient body 13 formed integrally with the shutter 8 to extend from one end 8a of the connecting portion 10 thereof, is made of a second synthetic resin, such as nylon resin, which is excellent in elasticity. The second resin is deeply penetrated into the first synthetic resin by length $l_3$ as illustrated in solid lines at 13b in FIG. 6, so that the resilient body 13 is prevented from separating from the shutter 8.

Figure 7:
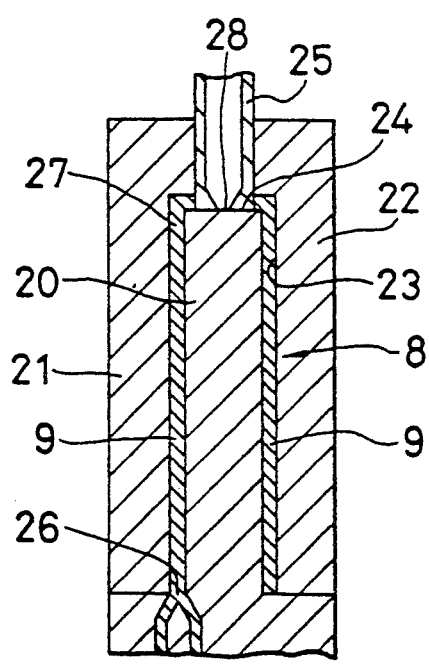
FIGS. 7 to 9 are cross-sectional views of a metal mold illustrated for the purpose of how to mold the shutter of FIG. 6.
Figure 8:
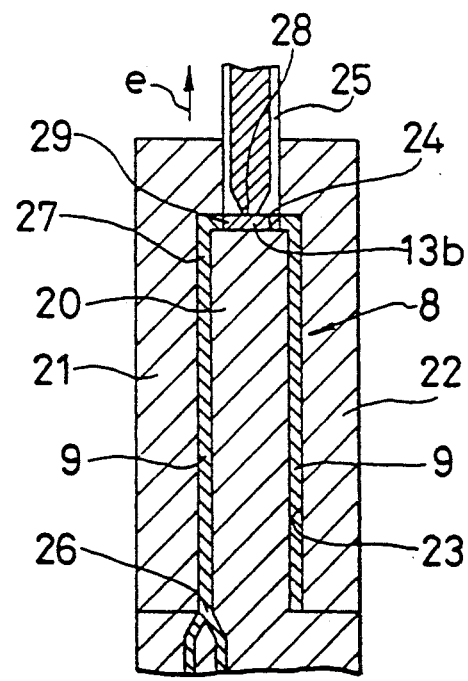
Figure 9:
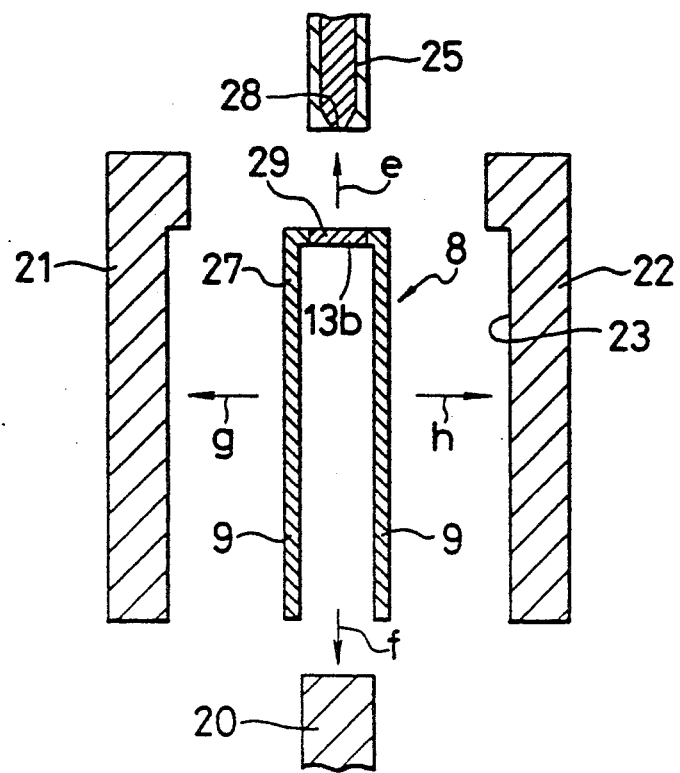

A method of molding the above-described shutter 8 together with the resilient body 13 will be hereinafter described with reference to FIGS. 7-9. As shown in FIG. 7, a first cavity 23 is formed by metal molds 20 to 22. The first cavity 23 has a U-shaped section so as to correspond to the pair of shutting plates 9 and the connecting portion 10. A second cavity 24 prepared so as to correspond to the resilient body 13 is initially closed by a slide core 25.

As shown in FIG. 7, first the first molten synthetic resin 27, such as polyacetal resin, which is excellent in formability and weatherproof, is injected into the first cavity 23 through an injection gate 26 so as to form the shutting plates 9 and connecting portion 10 of the shutter 8. Before the first synthetic resin 27 is not cured in the first cavity 23, the slide core 25 is slid in a direction of arrow e as shown in FIG. 8 to open a second injection gate 28, and then the second molten synthetic resin 29, such as nylon resin, which is excellent in elasticity is injected into the second cavity 24 through the second injection gate 28. Thus, the resilient body 13 to be connected to the connecting portion 10 of the shutter 8 as shown in FIG. 6 is formed integrally with the shutter 8. After the first and second synthetic resins are cured, the metal molds 20-22 and the slide core 25 are removed as shown in FIG. 9, respectively in direction of arrows f, g, h and e to take out the molded shutter 8 formed integrally with the resilient body 13.

The shutting plates 9 and connecting portion 10 of the shutter 8 are molded out of such a synthetic resin so as to be excellent in formability, so that a shutter 8 of less thickness than 0.2 mm can be easily obtained with high accuracy. Particularly, it is easy to form, with high accuracy, a corner portion 9a of the shutting plate 9 shown in FIG. 6, which is on the free end side of the shutting plate 9 and near to the opening 11.

Moreover, the shutting plates 9 and connecting portion 10 of the shutter 8 are molded out of such a synthetic resin so as to provide excellent weatherproofing, so that the free end sides of the shutting plates 9 are scarcely distorted in a direction of arrows i shown in FIG. 6 due to a secular change of the synthetic resin. Thus, the shutting plates 9 can always completely cover the head insertion openings 5 when located in their closed positions as illustrated in solid lines in FIG. 1.

Moreover, the resilient body 13 is molded out of such a synthetic resin as to be excellent in elasticity, so that it will be always kept secure to urge the shutter 8 toward its closed position.

Various modifications are possible within the scope of the appended claims, for example, the shutting plate 9 and the resilient body 13 may have various shapes. This invention is applicable not only to the floppy-disk cassette but also to disk cassettes accommodating various kinds of disk-like recording mediums, such as a hard disk.

Although various minor changes and modifications might be proposed by those skilled in the art, it will be understood that I wish to include within the claims of the patent warranted hereon all such changes and modifications as reasonably come within my contribution to the art.

What is claimed is:

1. A disk cartridge in which a recording medium is rotatably accommodated, comprising:
   a case having a head insertion opening provided therein;
   a shutter slidably secured to one end of the case thereof to open and close said head insertion opening;
   a resilient body formed integrally with the shutter at one end thereof and being elastically deflectable; and
   a free end of the resilient body abutting against an inside of the case but not being connected to the case, said resilient body having an elastic force sufficiently great for urging the shutter toward a position where the head insertion opening is closed.

2. A disk cartridge according to claim 1 wherein the shutter is made of a first synthetic resin which is excellent in formability and which is weatherproof, and the resilient body formed integrally with the shutter at one end thereof being made of a second synthetic resin which is excellent in elasticity.

3. A disk cartridge according to claim 2 wherein the second synthetic resin forming the resilient body is deeply penetrated into the first synthetic resin which forms the shutter when the shutter and resilient body are simultaneously molded.

4. A disk cartridge according to claim 1 wherein said shutter comprises oppositely facing shutting plates and an intermediate connecting portion such that the shutter has a substantially U-shaped section, and wherein said resilient body is formed integrally with and extends from one end of said intermediate connecting portion.

5. A disk cartridge in which a recording medium is rotatably accommodated, comprising:
   a case having a head insertion opening provided therein;
   a shutter slidably secured to one end of the case thereof to open and close said head insertion opening;
   a resilient body formed integrally with the shutter at one end thereof and being elastically deflectable;
   an end of the resilient body abutting against an inside of the case, said resilient body having an elastic force sufficiently great for urging the shutter toward a position where the head insertion opening is closed; and
   the shutter being made of a first synthetic resin which is relatively excellent in formability, and said resilient body formed integrally with the shutter at one end thereof being made of a second synthetic resin having a relatively excellent elasticity compared to the first synthetic resin which has a relatively less elasticity.

6. A disk cartridge in which a recording medium is rotatably accommodated, comprising:
   a case having a head insertion opening provided therein;
   a shutter slidably secured to one end of the case thereof to open and close said head insertion opening;
   a resilient body formed integrally with the shutter at one end thereof and being elastically deflectable;
   an end of the resilient body abutting against an inside of the case, said resilient body having an elastic force sufficiently great for urging the shutter toward a position where the head insertion opening is closed; and
   the shutter being made of a first synthetic resin which is excellent in formability, and the resilient body formed integrally with the shutter at one end thereof being made of a second synthetic resin which is excellent in elasticity, and wherein the second synthetic resin is in the form of a strip shape within a groove at a connecting portion of the shutter between opposing shutter plates.

* * * * *